United States Patent
McLaughlin

(10) Patent No.: US 11,047,177 B2
(45) Date of Patent: Jun. 29, 2021

(54) CONNECTION AND PROTECTIVE RING THEREFOR

(71) Applicant: National Oilwell Varco UK Limited, Stonehouse (GB)

(72) Inventor: Thomas Kilpatrick McLaughlin, Aberdeenshire (GB)

(73) Assignee: National Oilwell Varco UK Limited

( * ) Notice: Subject to any disclaimer, the term of this patent is extended or adjusted under 35 U.S.C. 154(b) by 839 days.

(21) Appl. No.: 15/531,333

(22) PCT Filed: Dec. 2, 2015

(86) PCT No.: PCT/GB2015/053678
§ 371 (c)(1),
(2) Date: May 26, 2017

(87) PCT Pub. No.: WO2016/087847
PCT Pub. Date: Jun. 9, 2016

(65) Prior Publication Data
US 2017/0321494 A1    Nov. 9, 2017

(30) Foreign Application Priority Data

Dec. 3, 2014    (GB) ..................................... 1421477

(51) Int. Cl.
*E21B 17/04* (2006.01)
*F16L 15/04* (2006.01)
(Continued)

(52) U.S. Cl.
CPC ............ *E21B 17/042* (2013.01); *E21B 41/02* (2013.01); *F16L 15/04* (2013.01); *F16L 58/182* (2013.01)

(58) Field of Classification Search
CPC ........ E21B 17/042; E21B 41/02; F16L 15/04; F16L 58/182; F16L 15/003
See application file for complete search history.

(56) References Cited

U.S. PATENT DOCUMENTS 4,400,019 A    8/1983    Fruck
4,848,459 A *  7/1989    Blackwell ............... E21B 23/06
                                                166/142
(Continued)

FOREIGN PATENT DOCUMENTS

DE    4139565 A1 *  6/1993 ................ E03F 3/04
GB    1409096 A  * 10/1975 .............. F16L 11/08
(Continued)

OTHER PUBLICATIONS

European Patent Application No. 15807984.8 Examination Report dated Oct. 14, 2019 (4 pages).
(Continued)

*Primary Examiner* — James M Hewitt, II
(74) *Attorney, Agent, or Firm* — Conley Rose, P.C.

(57) ABSTRACT

A connection includes first and second lined tubular members having a coincident bore and a protective ring. The first lined tubular member has a pin end and the second lined tubular member has a box end. Each lined tubular member includes a tubular body, an annular liner, and a mortar filled annulus therebetween. The mortar filled annulus has an annular recess therein at at least one of the pin end and box end for receiving a part of the protective ring. The part received may be a flange on the ring.

15 Claims, 4 Drawing Sheets

(51) Int. Cl.
      *E21B 41/02*       (2006.01)
      *F16L 58/18*       (2006.01)
      *F16L 15/00*       (2006.01)
      *E21B 17/042*     (2006.01)

(56)           References Cited

U.S. PATENT DOCUMENTS

| | | |
|---|---|---|
| 5,236,231 A | 8/1993 | Allen et al. |
| 5,470,111 A | 11/1995 | Nelson et al. |
| 5,779,276 A | 7/1998 | Allen |
| 6,036,235 A | 3/2000 | Anderson et al. |
| 8,496,273 B1 | 7/2013 | Carstensen |
| 2009/0167016 A1 | 7/2009 | Zapata et al. |
| 2012/0248766 A1* | 10/2012 | Schwalbach ............ F16L 15/04 285/332.3 |
| 2014/0333061 A1 | 11/2014 | Zapata et al. |

FOREIGN PATENT DOCUMENTS

| | | |
|---|---|---|
| WO | 2009/004387 A2 | 1/2009 |
| WO | 2010/077344 A1 | 7/2010 |
| WO | 2015/145107 A1 | 10/2015 |

OTHER PUBLICATIONS

International Patent Application No. PCT/GB2015/053678, International Search Report and Written Opinion dated Apr. 26, 2016 (12 pages).
GB Patent Application No. 1421477.9, Search Report dated Feb. 6, 2015 (2 pages).

\* cited by examiner

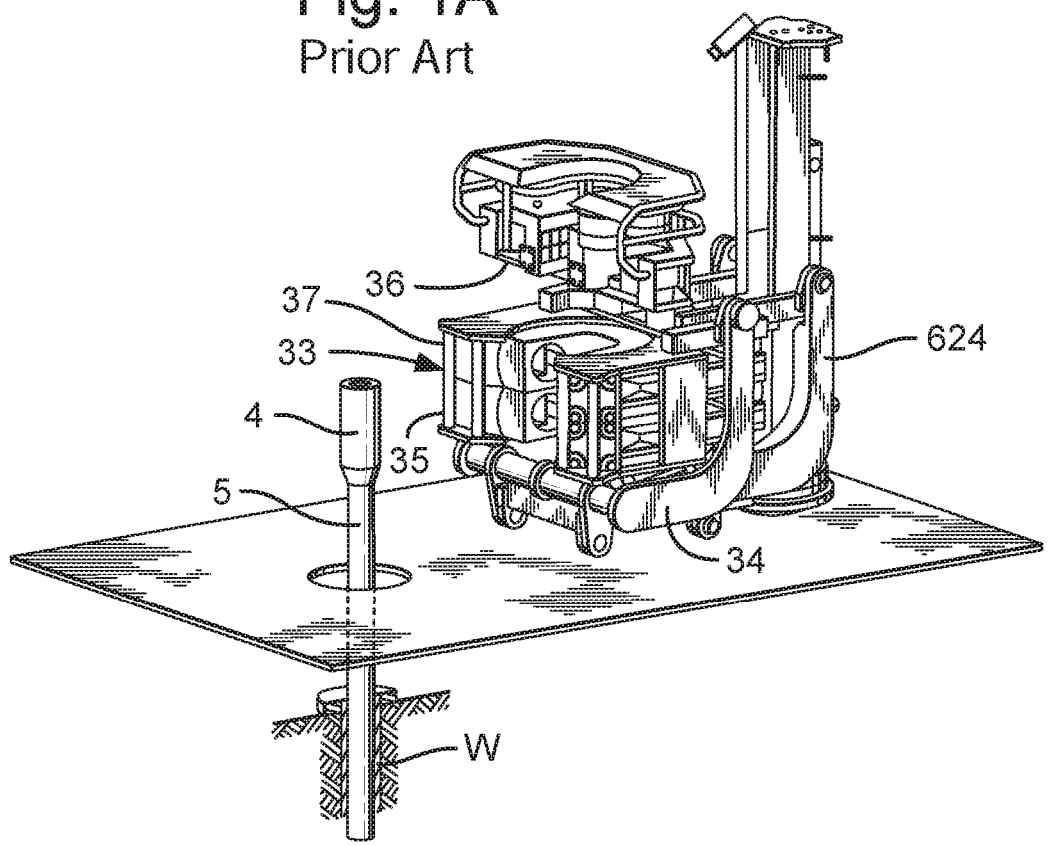

CONNECTION AND PROTECTIVE RING THEREFOR

CROSS REFERENCE TO RELATED APPLICATIONS

This application is a 35 U.S.C. § 371 national stage application of PCT/GB2015/053678 filed Dec. 2, 2015, which claims priority to GB Patent Application No. 1421477.9 filed Dec. 3, 2014, both of which are incorporated by reference herein in their entireties for all purposes.

STATEMENT REGARDING FEDERALLY SPONSORED RESEARCH OR EVELOPMENT

Not applicable.

BACKGROUND

The present disclosure relates to a connection between two tubular members, to a protective ring, and to a method of connecting tubular members.

Many tubular members are used to convey corrosive or erosive materials in the construction, maintenance, injection and production phases of oil and gas wells. Examples of such tubular members are casing, risers, drill pipe, drill collars, pup joints, production tubing, and pipelines. The tubular members may be rigid, flexible and/or coilable.

Rigid tubular members are generally made from mild steel in sections having upper and lower threaded ends. Each section, known as a joint, is typically between 7.32-13.41 m (24-44 feet) long, although shorter sections are also utilised for certain purposes. This rigid tubular member is rigid to the extent that it is self-supporting when racked vertically and when racked horizontally between ends, deflects negligibly under its own weight.

Flexible tubulars, such as flexible risers are made of several concentric layers, including steel helical bands and plastic composite layers. Flexible risers are coiled on to large reels and thus of a long length with few connections when in situ. The connections are generally of the threaded type with proprietary independently rotatable or push-fit or bayonet style collars.

Coiled tubing is generally small diameter (typically less than 3.25 inches, (83 mm)) and made from a mild steel. The connections are generally of the threaded type with proprietary independently rotatable or push-fit collars. Coiled tubing is coilable on to reels.

In certain circumstances, tubular members may transport fluids that are highly corrosive to the mild steel used in the body of the tubular. Such circumstances may be in the drilling for oil and gas in particular types of formation likely to encounter corrosive fluids; in conveying production fluids which may be corrosive; in fracking operations in which corrosive fluids may be used, such as sea water; and in well stimulation operations such as re-injection of oil and gas wells, in which sea water may be used. Injection fluids, production fluids or fluids found in the zones being drilled through may produce highly corrosive fluids which may attack the mild steel tubulars.

To overcome corrosion problems, and is well known to those skilled in the art, such tubulars may be made from chromium alloy instead of mild steel. However, chromium alloy is very expensive and if a surface of the chromium alloy tubular is scratched, corrosion can still occur. Drill pipe may be coated in a corrosion resistant coating. However, such coatings are prone to being chipped and scratched. Drill pipe is generally designed to flex between upper and lower upsets and tend to twist under extreme torsion from being driven by a top drive, rotary table, downhole electric or mud motor and is thus usually coated.

It is also common to use lined mild steel tubular members with liners made of glass reinforced epoxy, plastic, stainless steel, or other corrosion resistant materials. Such lined steel tubular members may be used for production tubing, pipelines and casing, such as: conductor casing; surface casing; intermediate casing; production casing; liner casing, which is casing that does not extend to a wellhead, but hung from a lower end of a casing string; and tieback casing, which may be used to link the liner casing back to the wellhead. The liners are formed as separate members which may be rigid to the extent that they are self-supporting between ends and when racked.

Corrosive fluids may be two-phase or multi-phase fluids, such as sea water, which has dissolved salts and air trapped therein. Sea water and other corrosive fluids are commonly used in re-injection wells. A re-injection well may be an existing well into a reservoir or a specially drilled well into a depleted reservoir. Re-injection fluids are pumped down into the reservoir to stimulate and increase pressure in the reservoir to force any desirable oil out of the reservoir through a producing well.

Corrosive fluids may also be produced oils and gases and thus lined production tubulars and lined pipe lines are often desirable. Such production fluids may be multi-phase fluids containing liquid and gas.

One typical lined tubular is a dual or double walled tubular in which the inner wall is a liner tube made of a corrosion resistant material that serves as a conductor for the corrosive fluid, and an outer wall or pipe that is designed to provide strength to withstand the internal pressures of the corrosive fluid, as well as external forces such as external pressure, mechanical loading, etc. An example of this type of pipe is TK™-lined pipe, sold by National Oilwell Varco L.P. in which a steel walled tubular is lined with a Glass Reinforced Epoxy (GRE) liner. The GRE liner is inserted into a steel walled tubular and cemented to the inside wall of the steel walled tubular. Rigid tubulars are of limited length due to conditions and limitations to which the tubulars are subjected on site, such as storage racks and handling equipment. Thus, in the case of joints of production tubing and casing, each joint is usually about 7.32-13.41 m (24-44 feet) long while the tubing or casing string itself may be hundreds or even thousands of metres long. Accordingly, and as is well known in making up strings of tubulars, such as casing string, successive joints of casing are connected together using a coupling until the desired length of string is achieved. Similarly in pipelines successive pieces of pipe are joined using couplings. Both ends of joints of casing are generally male and thus use a female, internally threaded coupling to join the two ends. There is a need for a way of reducing the risk of corrosion in the coupling and the threads between the coupling and the pipe ends.

Typically, the coupling comprises an annular body for placement between and to which two tubulars may be connected. The annular body has a thread on its interior surface for receiving a threaded pin end of each of the tubulars. An annular gasket, known as a Corrosion Barrier Ring (CBR) is positioned substantially centrally within and co-axial with the annular body. In use, each tubular comes into abutment with one side of the annular gasket as it is screwed into the annular body. An example of such a coupling assembly is shown in U.S. Pat. No. 5,470,111.

WO 2009/004387 discloses an apparatus comprising a first tubular having a first tubular end and second tubular having a second tubular end arranged in a coupling with a gap between the first tubular end and the second tubular end wherein a spacer is arranged between the first tubular end and the second tubular end, the spacer comprising a body having an interior surface which is not resilient and having a length, the body comprising a first member and a second member, the first member movable relative to the second member to contract the length of the spacer, and the first and second member fit together with a friction fit.

As an alternative to using a coupling, each section of tubular has a pin end and a box end. A male threaded pin end of a first tubular is screwed into a female threaded box end of a second tubular.

An accessory box is used on the end of a joint of chromium steel casing, perforate casing, tool or other unlined item, as a connection to a lined casing. The end of the lined casing and thread thus need to be protected against corrosive and erosive fluids.

An example of a connection with which the present disclosure is appropriate, is the Tejas TTS6 and TTS8 Tubular Two Step premium connection is typically rated to 100% joint efficiency for tensile, burst and collapse strength. These two step connections provide easy stab, dual sealing, gall resistance, high torque strength values and a good gas tight seal. Similar types of connection with which the present disclosure is appropriate is made by Hydril. Other types of connection with which the present disclosure is appropriate are Benoit and TMK which have conical integral connections which have the same pin/box length and externally shouldered.

SUMMARY OF DISCLOSURE

It is desirable, where successive joints of the lined or clad tubular members are joined to one another that the interior of the connection is protected from corrosion. It is desirable, where successive joints of the lined or clad tubular members are joined to one another directly or by means of a coupling that the threads of the tubular members are protected from corrosion.

The inventor has noted that casings and production tubulars are frequently placed in deviated wells and are thus subjected to slight bends. Thus the connection or coupling assembly is subjected to tensile loads on one side of the connection or coupling, whilst the opposing side is subjected to compression loads due to such bends, as well as torque through the string of casing as the well is constructed.

The inventor has also noted that parts of the connection are subject to manufacturing tolerances and design differences, particularly, but not exclusively, to the distance between a nose of the pin end of a tubular member and a shoulder of a box end of a further tubular member such as in "two-step premium" connections. The inventor also noted that prior art systems for protecting threads required machining of the tubular member.

According to the present disclosure, there is provided a connection comprising first and second lined tubular members having a coincident bore and a protective ring, the first lined member having a pin end and the second lined tubular member having a box end, each lined tubular member comprising a tubular member, an annular liner and an annular region therebetween at least partly filled with mortar, characterised in that the annular region has an annular recess in at least one of the pin end and box end for receiving a part of a protective ring.

The tubular member does not have to be machined, which may alter the tubular member's structural integrity. Furthermore, the cost and time in machining is mitigated. Furthermore, the connection can be re-threaded and the casing reused if necessary. If a casing has had a grove machined into it, the box cannot be further machined if the tubular member needs rethreading.

Advantageously, in an embodiment, the connection is between two members having the same internal diameter which have internal shoulders which almost abut, having a very small gap therebetween of perhaps less than 10 mm and perhaps less than 1 mm. In an embodiment, the protective ring sits over the very small gap inhibiting the flow of corrosive fluids through the very small gap and into the thread. The thread may be a single thread or have multiple threads spaced along the pin and box. One or more sealing surfaces may be provided at one or more points along the pin and box.

In an embodiment, an annular recess is defined by the annular liner, the tubular member and the mortar. The annular recess may also be defined by the annular liner, the tubular member and an O-ring. In at least some embodiments, the annular recess is located in the pin end.

In an embodiment, the protective ring comprises a flange received in the annular recess. The flange may be a planar cylindrical flange, and it may have a length which is equal to or less than the depth of the annular recess. In an embodiment, the depth of the flange is substantially equal to the thickness of the mortar between the outer surface of the liner and internal surface of the tubular member. In an embodiment, the flange has a pointed distal end. The protective ring may be made from a thermoplastics material and may be injection moulded in a single piece. In an embodiment, the protective ring is rigid and not compressible. In an embodiment, the liner has a plane internal surface of constant diameter. In an embodiment, the tubular body has a plane internal surface of constant diameter In an embodiment, a further annular recess is located in the box end. The protective ring may comprise a further flange received in the further annular recess, and the further flange may be adhered or have a friction fit in the further annular recess. In an embodiment, the flange and further flange lie symmetrically about a centre line of the central body.

In an embodiment, the protective ring comprises a ring body with the flange extending from a side thereof. The further flange may extend from an opposing side of the ring body, and in some embodiments, the ring body has an inner surface which is coincident with the liners.

In an embodiment, the box end has at least one thread and the pin end has a corresponding thread arranged along a first diameter. The box end has at least one second thread and the pin end has a corresponding second thread arranged along a second diameter, and it may have a step between the first and second diameters. In an embodiment, the box end has at least one sealing surface and the pin end has a corresponding sealing surface. The box end may have at least one mouth and the pin end has a corresponding beak, whereupon the beak entering the mouth inhibits the beak of the box end separating from the body of the pin end and may facilitate a further seal.

In an embodiment, the tubular member may be any pipe, coupling, or downhole tool having a connection and bore and may be any of the following: casing, production tubular, liner and pipelines for conveying oil, gas or corrosive liquids and gases.

In an embodiment, the box end has an outer diameter coincident with the outer diameter surface of the tubular member. The box end may have an outer diameter larger than the outer diameter surface of the tubular member forming an upset. The pin end may have an outer diameter coincident with the outer diameter surface of the tubular member. In an embodiment, the pin end has an outer diameter larger than the outer diameter surface of the tubular member forming an upset.

The present disclosure also provides a protective ring of the connection of the disclosure, wherein the protective ring has a body and a flange, the flange having a depth substantially equal to the thickness of the mortar filled annulus. In an embodiment, the body has an inner surface substantially coincident with an inner surface of the liner, and the protective ring may comprise a second or further flange.

The present disclosure also provides a lined tubular member comprising a box end, a tubular body, an annular liner and a mortar filled annulus therebetween, characterised in that the mortar filled annulus has an annular recess and a protective ring comprising a body and a flange and a further flange, the flange installed in the annular recess. In an embodiment, the flange is fixed in said annular recess by a hoop strength friction fit or using an adhesive.

The present disclosure also provides a method for connecting lined a first and second tubular member, the first lined tubular member having a pin end and the second lined tubular member having a box end, the first and second lined tubular member each further comprising a tubular body, an annular liner and a mortar filled annulus therebetween, the mortar filled annulus having an annular recess therein at the pin end, the box end provided with a protective ring the method comprising the steps of stabbing the pin end into the box end, spinning the lined tubular member whereupon a part of the protective ring inserts into the annular recess and torqueing the connection.

In an embodiment, the flange and recess or tongue and groove connection between the ends of the tubulars provides a tortuous path for fluids to take between the flow channel of the tubular and the space formed between the outer surface of the protective ring, the internal surface of the tubular members, the ends of the tubulars and the ends of the threads. A small quantity of fluid may flow along this tortuous path which allows fluid pressure to equalise, but restricts freely flowing fluid next to the mild steel of the ends of the tubulars and the connection. The corrosive nature of the small amount of corrosive fluid in the space causes negligible corrosion. However, without the protective ring of the disclosure, large quantities of freely flowing corrosive fluids increase corrosion by introducing large quantities of fresh corrosive elements, such as fresh acids, salts and gases continuously replenishing. Thus by reducing freely flowing fluid next to the steel, risk of corrosion is reduced.

Thus, in some embodiments described herein, part of the protective ring is held by a means located between the interior surface of the tubular and the outer surface of the liner. During use, the tubular members, such as casing can be subjected to large changes in temperature. For example, temperatures in the well can reach 350 degrees Celsius and for example, during re-injection of cold sea water, the casing is cooled to 10 degrees Celsius or lower. This change in temperature causes the casings to expand and contract, which may move the ends of the tubulars closer together and further apart. Such cyclical movement can damage protective rings and/or allow fresh corrosive fluids to contact the coupling. Corrosion of the tubular will alter its dimensions. Such a corrosion may be slow and take years to occur, but may nonetheless alter the dimensions sufficiently to render the prior art protective rings defunct. Certain embodiments disclosed herein do not rely on compressive forces to hold the protective ring in place and allow for such movement, whether induced by temperature movement, corrosion or by bending in deviated wells.

BRIEF DESCRIPTION OF THE DRAWINGS

For a better understanding of the present disclosure, reference will now be made, by way of example only, to the accompanying drawings, in which:

FIG. 1A is a perspective view of an iron roughneck for making or breaking a connection, shown on a rig floor of a drilling rig;

DETAILED DESCRIPTION OF DISCLOSED EXEMPLARY EMBODIMENTS

Figure 1:
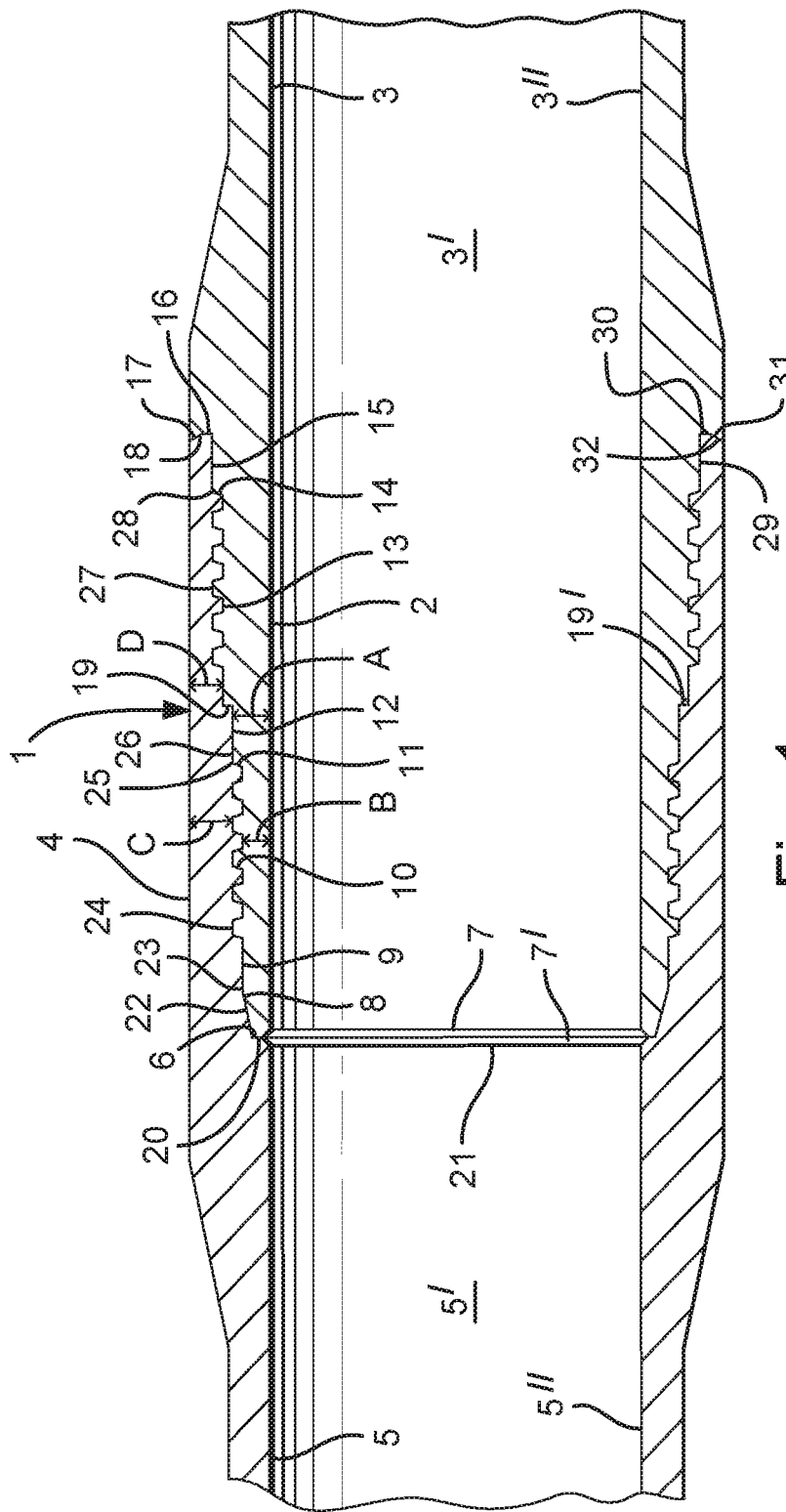
FIG. 1 is a side cross-sectional view of a prior art connection between tubulars showing a threaded pin end of a first tubular screwed into a threaded box end of a second tubular.

Referring to FIG. 1, there is shown a prior art connection generally identified by reference numeral 1. The connection 1 comprises a threaded pin end 2 of a first tubular member 3 screwed in a threaded box end 4 of a second tubular member 5. The first and second tubular members 3 and 5 are generally made from a mild steel or chromium steel material and have a coincident bore 3' and 5' through which fluids can flow.

The threaded pin end 2 has a tip in the form of a planar nose 6 with an internal chamfer 7. A frusto-conical sealing surface 8 extends from an outer edge of the planar nose 6. A first end plane cylindrical surface 9 extends from a top of the frusto-conical sealing surface 8 to a start of a first male thread 10. The first thread 10 may be a parallel thread or very slightly wedged. The first thread 10 extends along the pin end 2 to finish at a step 11. A central plane cylindrical surface 12 extends from said step 11 to a start of a second male thread 13. It should be noted that the step 11 provides a step increase in thickness from thickness B to thickness A. The second thread 13 may be a parallel thread or very slightly wedged. A further step 19 is provided to allow for a further change in depth. The second thread 13 extends along pin end 2 to a step 14. The steps 11 and 14 may be substantially the same height as the depth of the respective thread 10, 13. A second end plane cylindrical surface 15 extends from a top of the step 14 to a shoulder 16 which has an angled frusto-conical surface 17 forming a mouth 18.

The threaded box end 4 has an internal shoulder 20 with an internal chamfer 21. A frusto-conical sealing surface 22 extends from an outer edge of the internal shoulder 20. A first end plane cylindrical surface 23 extends from a top of the frusto-conical sealing surface 22 to a start of a first female thread 24. The first female thread 10 may be a parallel thread or very slightly wedged. The first female thread 24 extends along the box end 2 to finish at a step 25. A further step 19' is provided to allow for a further change in depth. A central plane cylindrical surface 26 extends from said step 25 to a start of a second female thread 27. It should be noted that the step 25 and step 19' provides a step decrease in thickness from thickness C to thickness D. The combination of large thicknesses A and C with small thicknesses B and D provide a strong connection suitable for both internal and external high pressures. The second female thread 27 may be a parallel thread or very slightly wedged. The second female thread 27 extends along box end 4 to a step 28. A second end plane cylindrical surface 29 extends from a top of the step 28 to a nose 30 which has an angled frusto-conical surface 31 forming a beak 32.

In use, an apparatus such as an iron roughneck 33 is used to make or break connections. The second tubular member 5 is held in a spider (not shown) in a well W. The first tubular member 3 is handled with a pipe handler (not shown) to insert the pin end 2 into the box end 4 of the second tubular member 5. The iron roughneck 33 is offered up to the first and second tubular members 3 and 5 using a selectively extendible arms 34. A back-up tong 35 grips the box end 4 of the second tubular member 5 to inhibit rotation. The first tubular member 3 is rotated with a spinner 36 to thread the pin end 2 into the box end 4. As the pin end 2 moves into the box end 4, the beak 32 fits into the mouth 18. A power tong 37 is then used to torque the connection. The frusto-conical surface 31 of the nose 30 slides along the corresponding frusto-conical surface 17 of the mouth 30, pulling the mouth 30 of the box end 4 to the body of the pin end 2. Frusto-conical surface 8 of the pin end 2 rides along corresponding frusto-conical surface 22 of the box end 4 providing a metal-to-metal seal. A small gap is provided between the plane cylindrical surfaces 9, 12, 15 of the pin end 2 and corresponding plane cylindrical surfaces 23, 26, 28 of the box end 4. A small gap 7' may also provided between nose 6 of pin end 2 and shoulder 20 of the box end 4 to allow the frusto-conical surface 8 of the pin end 2 to ride along corresponding frusto-conical surface 22 of the box end 4 to properly form a metal-to-metal seal.

Figure 2:
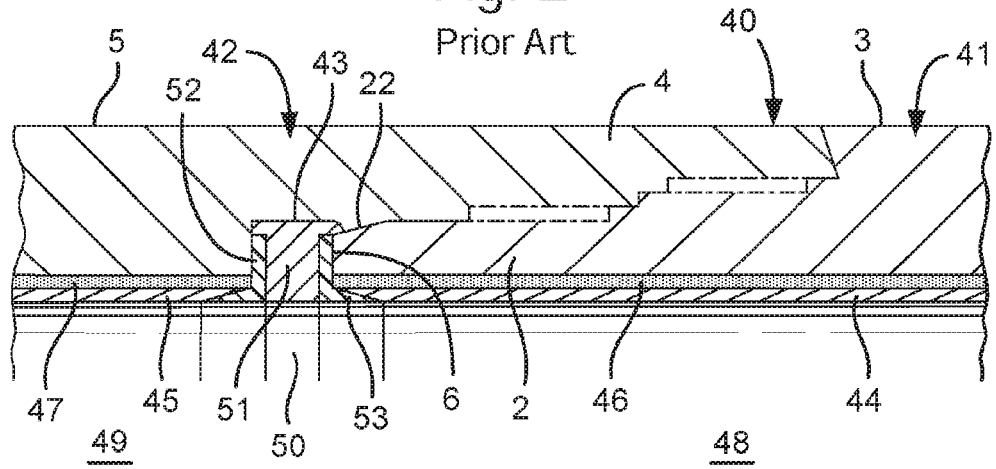
FIG. 2 is a side cross-sectional view of a prior art connection between a lined tubular tubulars.

FIG. 2 shows a prior art connection 40 between lined first and second tubular members 41 and 42. The lined first and second tubulars 41 and 42 comprise the first and second tubular members 3 and 5, described with reference to FIG. 1 with liners 44 and 45 installed in the following way.

Before the connection is made, the box end 4 of second tubular 5 has a circumferential groove 43 machined therein at a foot of the frusto-conical surface 22. The nose 6 of the pin end 2 is also milled to remove a few millimetres therefrom and provided with a planar nose. A first and second GRE (Glass Reinforced Epoxy) liner 44 and 45 is slid into bores 3' and 5' of respective first and second tubular members 3 and 5 and a mortar 46 and 47 injected therebetween to fix the liners 44 and 45 in respective bores 3' and 5'. New bores 48 and 49 provide a corrosion resistant flow path for corrosive fluids. The thickness of mortar 46 and 47 used is approximately 2 mm. The thickness of the liner 44 and 45 is approximately 2 mm. A ring 50 comprises a T-shape ring 51 and flared rings 52 and 53 arranged either side. The T-shaped ring 51 is made from PTFE 25% glass-fill and is compressible, which prevents corrosive fluids from reaching the seal formed between pin end sealing surface 8 and box end sealing surface 22.

In use, the ring 50 is offered up to the groove 43 through the mouth of the box end 4 and pushed into the groove 43. The position of the groove 43 and the width of the ring 50 is such that the upon the connection being made, the nose 6 of the pin end 2 contacts the flared ring 53 to hold the ring 50 in place.

Figure 3:
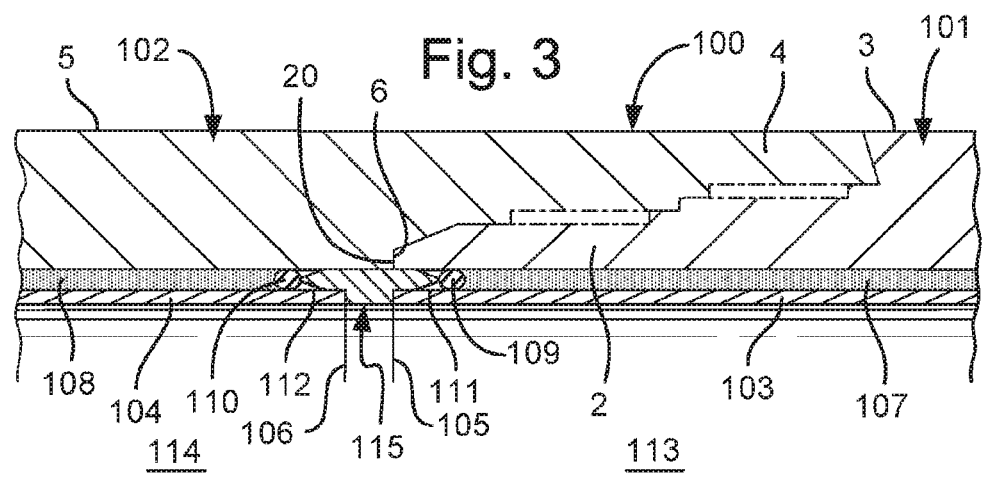
FIG. 3 is side cross-sectional view of a connection in accordance with the present disclosure between lined tubular members showing a threaded pin end of a first tubular member, a threaded box end of a second tubular member and a protective ring in accordance with the present disclosure.
Figure 4:
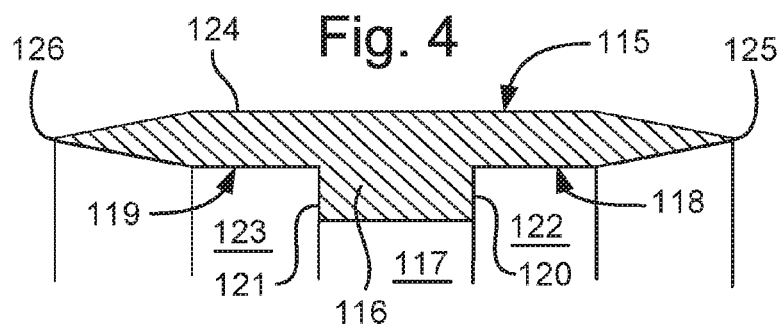
FIG. 4 is a side cross-sectional enlarged view of the protective ring shown in FIG. 3.
Figure 5:
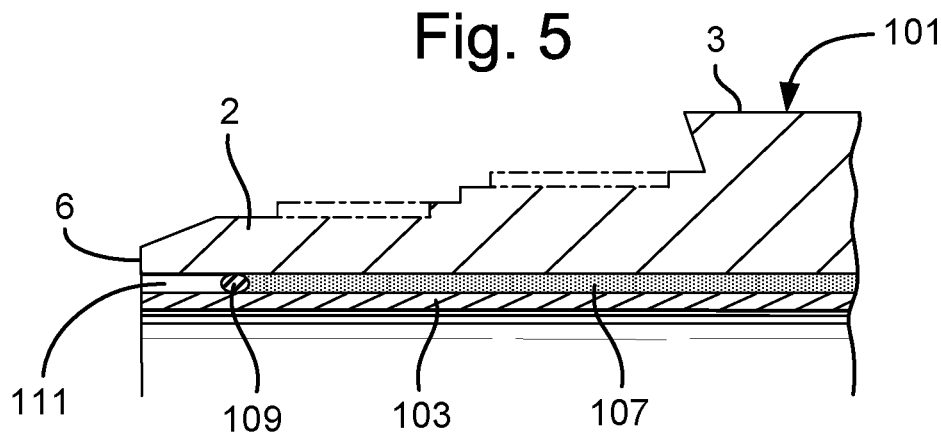
FIG. 5 is a side cross-sectional view of the threaded pin end shown in FIG. 3.

FIG. 3 shows an exemplary connection of the present disclosure, the connection generally identified by reference numeral 100. The connection 100 comprises lined first and second tubular members 101 and 102. The lined first and second tubular members 101 and 102 comprise first and second tubular members 3 and 5 shown in FIG. 1 and respective GRE liners 103 and 104.

The first lined tubular member 101 has the GRE liner 103 extending through pin end 2 terminating at an end 105 in line with the nose 6. The GRE liner 103 is held in place by a mortar 107. An O-ring 109 is arranged at the end of the mortar 107 and is set back from the end 105 by a flange length distance to form an annular recess 111. The second lined tubular member 102 has GRE liner 104 extending through the tubular member 102 terminating at an end 106 at a predetermined distance from the internal shoulder 20 of the box end 4 and is held in place with mortar 108. An O-ring 110 is arranged at the end of the mortar 107 and is set back from the end 106 by a flange length distance to form an annular recess 112. The mortar 107 and 108 is approximately 1 to 5 mm thick in some embodiments and 2 mm thick in other embodiments. The GRE liner 103 and 104 is approximately 2 mm thick, although may be between 1 mm to 10 mm thick and thus does not significantly change the size of bores 113 and 114.

A protective ring 115 comprises a central body 116 having a thickness approximately equal to the combined thickness of the liner 103 and mortar 107. The central body 116 has a smooth plane cylindrical internal surface 117. Opposing flanges 118 and 119 extend from either side of the central body 116. Each flange 118 and 119 has a plane cylindrical internal surface 122 and 123 meeting each side defining a shoulder 120 and 121. The depth of the shoulder is substantially equal to the thickness of the liner 103. An outer surface 124 of the flanges 118 and 119 is planar with the outer surface of the central body 116. The protective ring 115 has an overall length of approximately one inch (25.4 mm), although may be between 15 mm and 54 mm in length. The flanges 118 and 119 have a depth which is substantially equal to the mortar thickness 107. The flanges 118 and 119 have pointed distal ends 125 and 126, the pointed distal ends 125 and 126 being substantially central between the internal surfaces 122 and 123 and the outer surface 124. The flanges 118 and 119 have a length of approximately 9 mm, tapering approximately half way therealong. The predetermined distance referred to above from the internal shoulder 20 of the box end 4 to the end 106 of the liner 104 is substantially the same as the width of the central body 116, and may be 6 mm in some embodiments and may be between 2 mm and 20 mm in other instances.

The absolute measurements stated above are suitable for use in a 7 inch liner having a Two Thread Premium connection.

In an embodiment, the protective ring 115 is made from a plastics material such as a thermoplastic and formed by injection moulding in a single unitary piece.

The lined first and second tubular members 101 and 102 are lined with liners 103 and 104 using the following process, described with reference to a tubular member 3 having a pin end 2 at one end and a box end (not shown, but like box end 4) at the other. The tubular member 3 is laid at a slight incline with the pin end 2 at the lower end. An injection head (not shown) is attached to the lower pin end 2. Liner 103 is inserted through the upper box end 4 and slid into the bore 3' until the end 105 abuts the injection head. A cement based mortar is pumped through the injection head into an annulus formed between the liner 107 and an interior wall 3" of the first tubular member 3. Pumping ceases when the cement based mortar exits the annulus at the box end 4. The end 106 of the liner 103 is trimmed using a trimming tool (not shown) at a predetermined distance from the shoulder 20 of the box end 4. The O-ring 110 is then pushed into the wet cement based mortar in the annulus a flange length distance to form annular recess 112. The O-ring 110 may be pushed in with an O-ring insertion tool comprising an open cylindrical end having an outer diameter approximately equal to the diameter of the bore 5' and having a wall thickness of approximately 2 mm.

The injection head is disconnected from the pin end 2. The liner 103 is trimmed to be flush with the nose 6. The O-ring 109 is pushed into the wet cement based mortar 107 a flange length distance to form annular recess 111 using the O-ring insertion tool.

Figure 6:
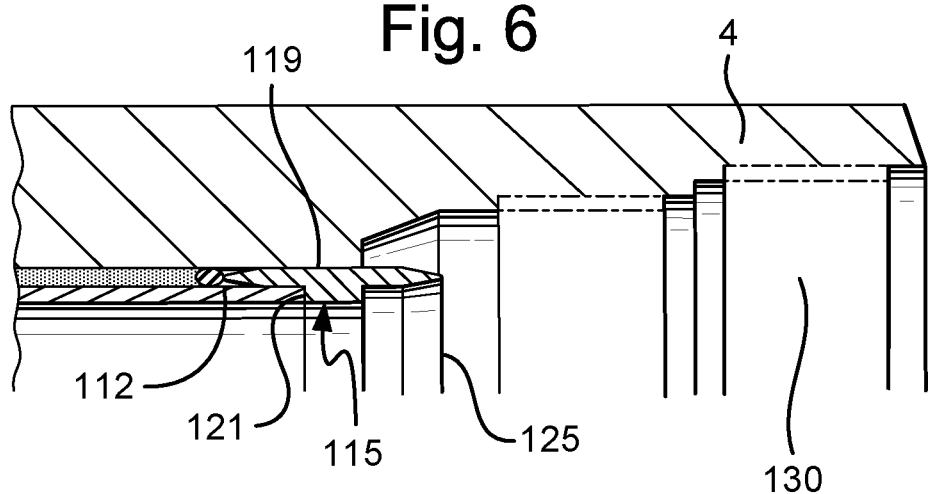
FIG. 6 is a side cross-sectional view of the threaded box end shown in FIG. 3.

In use, the protective ring 115 is installed in the lined tubular member 102. The protective ring 115 is offered up to annular recess 112 through mouth 130 of box end 4. The flange 119 enters annular recess 112 until the shoulder 121 abuts the end 106 of the liner 104, as shown in FIG. 6. The pointed distal end 126 facilitates a smooth insertion of the flange 119 into the annular recess 112. In some embodiments, the flange 119 has a friction fit in the annular recess 112. The protective ring 115 has a hoop strength, which may facilitate a friction fit against the interior wall 5" of the tubular member 5. The protective ring 115 may also have a tight fit between an inner wall 5" of the tubular member 5 and an outer wall of the liner 104 to provide a seal or a tortuous path for fluid to travel. The protective ring 115 may additionally be glued in place. The lined tubular member 102 and installed protective ring 115 may now be transported to the point of use, such as at a well centre of a drilling rig and held therein with the box end 4 upright ready to receive the pin end 2 of lined tubular member 103. Pin end 2 is then inserted into the box end 4 of tubular member 105 and threaded using a spinner 36 of an iron roughneck 33. The flange 118 is guided by pointed distal end 125 into annular recess 111. The outer wall 124 of the protective ring 115 thus covers the small gap 7' leading into the metal-to-metal seal and the first and second threads 10, 24 and 13, 27.

Fluid, such as corrosive sea water may then flow through bores 113 and 114 of the lined tubular members 101 and 102. The fluid may be sealed from or seep through a tortuous path between the GRE liners 103 and 104 and the protective ring 115, and across pointed distal ends 125 and 126, which may embed themselves into O-rings 109 and 110 providing a further seal or continue the tortuous path to inhibit egress of corrosive fluids from within the bore to the opening 7'.

Figure 7:
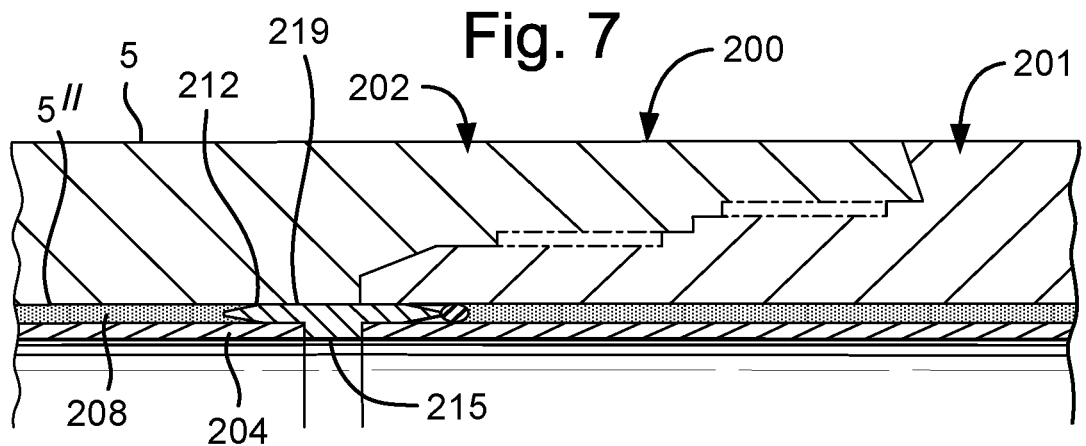
FIG. 7 is side cross-sectional view of a further connection in accordance with the present disclosure between lined tubulars showing a threaded pin end of a first tubular member, a threaded box end of a second tubular member and a protective ring in accordance with the present disclosure.

A further embodiment of a connection in accordance with the present disclosure is shown in FIG. 7, which shows a connection 200, which is substantially the same as the connection 100 shown in FIGS. 3 to 6, save for the deletion of O-ring 110. Like parts are referred to in the two-hundred series. In this embodiment, the mortar 208 in the annulus formed between the tubular member 5 and the liner 204 is compacted using the O-ring insertion tool described above. The protective ring 215 is offered up to the annular recess 212, whereupon flange 219 is inserted into the annular recess 212. The flange 219 of the protective ring 215 may be inserted whilst the cement based mortar is still wet, facilitating adherence of the protective ring 215 to the outer wall of the liner 204 and inner wall 5Δ of the tubular member 5.

Alternatively, an annular recess 212 in box end 4 may not be pre-formed. The protective ring 215 may simply be inserted and displacing the wet cement 208 until the central body abuts the end of liner 204.

The invention claimed is:

1. A connection comprising:
   first and second lined tubular members having a coincident bore and a protective ring, the first lined tubular member having a pin end and the second lined tubular member having a box end, each lined tubular member comprising a tubular body having an internal surface of constant diameter, an annular liner and a mortar filled annulus therebetween;
   wherein the box end has a sealing surface and the pin end has a corresponding sealing surface for providing a seal;
   wherein said mortar filled annulus has an annular recess therein at at least one of the pin end and box end configured to receive a part of the protective ring upon connection of the first and second tubular members;
   wherein the protective ring comprises a central body having a cylindrical internal surface configured to be coincident with an inner surface of one of the annular liners.

2. A connection as claimed in claim 1, wherein the annular recess is defined by said annular liner, said tubular member and said mortar.

3. A connection as claimed in claim 1, wherein the annular recess is defined by said annular liner, said tubular member and an O-ring.

4. A connection as claimed in claim 1, wherein the protective ring comprises a flange received in said annular recess.

5. A connection as claimed in claim 4, wherein the depth of the flange is substantially equal to the thickness of the mortar filled annulus.

6. A connection as claimed in claim 4, wherein the flange has a pointed distal end.

7. A connection as claimed in claim 1, wherein said annular recess is located in said pin end and a further annular recess is located in said box end.

8. A connection as claimed in claim 7, wherein the protective ring comprises a flange received in said annular recess and a further flange received in said further annular recess.

9. A connection as claimed in claim 8, wherein said further flange is adhered or has a friction fit in said further annular recess.

10. A connection as claimed in claim 1, wherein the box end has at least one thread and the pin end has a corresponding thread arranged along a first diameter.

11. A connection comprising first and second lined tubular members having a coincident bore and a protective ring, the first lined tubular member having a pin end and the second lined tubular member having a box end, each lined tubular member comprising a tubular body, an annular liner and a mortar filled annulus therebetween, the box end having a sealing surface and the pin end having a corresponding sealing surface for providing a seal; wherein said mortar filled annulus has an annular recess therein at each of the pin end and box end, said protective ring is a single unitary piece including a body having a side and flanges extending therefrom, the flanges having a depth substantially equal to the thickness of said mortar filled annulus, the flanges received in said pin end and box end annular recesses.

12. A connection as claimed in claim 11, wherein the body has an inner surface substantially coincident with an inner surface of said liner.

13. A lined tubular member comprising:
  an annular liner;
  a tubular body;
  a box end including a sealing surface configured to provide a seal with a corresponding sealing surface of a pin end;
  the annular liner arranged in the tubular body, the tubular body of constant diameter along the length of the liner;
  a mortar filled annulus between the annular liner and the tubular body, wherein said mortar filled annulus comprises an annular recess; and
  a protective ring comprising a body and a flange and a further flange, the further flange being disposed in said annular recess, wherein the body has a cylindrical internal surface coincident with an inner surface of the annular liner.

14. A lined tubular member as claimed in claim 13, wherein said further flange is adhered in said annular recess.

15. A lined tubular member as claimed in claim 13, wherein said further flange is friction fitted in said annular recess.

\* \* \* \* \*